(12) United States Patent
Furuta et al.

(10) Patent No.: US 7,695,670 B2
(45) Date of Patent: Apr. 13, 2010

(54) IN-DIE COVER FORMING METHOD AND METHOD FOR MANUFACTURING PRODUCT INTEGRATED WITH COVER

(75) Inventors: Kenichi Furuta, Aichi-ken (JP); Tokimasa Ito, Aichi-ken (JP); Hiroshi Mukai, Aichi-ken (JP); Kazumichi Shigeno, Aichi-ken (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 808 days.

(21) Appl. No.: 11/492,228

(22) Filed: Jul. 25, 2006

(65) Prior Publication Data
US 2007/0075464 A1  Apr. 5, 2007

(30) Foreign Application Priority Data
Jul. 27, 2005  (JP) .............................. 2005-217938

(51) Int. Cl.
  *B29C 51/10*  (2006.01)
(52) U.S. Cl. ..................... 264/511; 264/510; 425/121
(58) Field of Classification Search ................. 264/511, 264/510; 425/121, 504
See application file for complete search history.

(56) References Cited
U.S. PATENT DOCUMENTS 2,788,048 A * 4/1957 Kimes ..................... 152/211
6,120,274 A * 9/2000 Gerig et al. ................ 425/116
7,108,101 B1 * 9/2006 Westhoff et al. ............ 182/90
2007/0075464 A1 * 4/2007 Furuta et al. ................ 264/510

FOREIGN PATENT DOCUMENTS

| JP | 07205167 A | * | 8/1995 |
| JP | A-2001-205167 | | 8/1995 |
| JP | A-2001-179759 | | 7/2001 |

* cited by examiner

*Primary Examiner*—Christina Johnson
*Assistant Examiner*—Galen Hauth
(74) *Attorney, Agent, or Firm*—Posz Law Group, PLC

(57) ABSTRACT

An in-die cover forming method for integrally forming a cover member with a surface of a base member in a die is provided. The die including an upper die half and a lower die half. The upper die halves are movable relative to each other. The base member is set on the lower die half such that its back is opposed to the lower die half. Using position determining mechanisms located between the lower die half and the back of the base member, the position of the surface of the base member in relation to the lower die half in the die moving direction is determined. The cover member is placed between the base member and the upper die half. The cover member is integrated with the surface of the base member by closing the upper die half with respect to the lower die half while pressing the cover member against the base member through vacuuming.

4 Claims, 2 Drawing Sheets

ID-DIE COVER FORMING METHOD AND METHOD FOR MANUFACTURING PRODUCT INTEGRATED WITH COVER

BACKGROUND OF THE INVENTION

The present invention relates to an in-die cover forming method, in which a cover is integrally formed with the surface of a base member in a die, and to a method for manufacturing a product integrated with a cover through the in-die cover forming method.

Interior parts such as side panels and lids of consoles, instrument panels, lids of glove compartments typically have an ornamental surface made of a cover material so that the parts have a quality appearance. When manufacturing such an interior part 80, a resin base member 81 and a cover member 82 are placed in a die 90 as shown in FIG. 3. Then, the die 90 is closed while pressing the cover member 82 against the base member 81 through vacuuming. Consequently, the cover member 82 is integrated with the surface of the base member 81. This method is referred to as the in-die cover forming method. The die 90 used in such a forming method includes an upper die half 90a and a lower die half 90b. The upper die half 90a has a cavity surface that corresponds to the shape of the surface of the base member 81. The lower die half 90b has a cavity surface that corresponds to the shape of the back of the base member 81.

As shown FIG. 3, the interior part 80 has a reinforcing ribs 81c and side walls 81b. When manufacturing the interior part 80 using the die 90, the shape of the back of the base member 81 including the reinforcing ribs 81c and the side walls 81b are caused to conform to the shape of the lower die half 90b as shown in the right half of FIG. 3. In other words, the base member 81 is placed on the lower die half 90b with the position of the base member 81 determined both in the longitudinal and transverse directions. The longitudinal and transverse directions are defined in a plane that is perpendicular to the direction in which the die halves 90a, 90b are moved relative to each other (vertical direction as viewed in FIG. 3).

Subsequently, the cover member 82, which has been heated and softened, is placed on the surface of the base member 81, and the upper die half 90a is placed on the upper surface of the cover member 82. Thereafter, the cover member 82 is drawn from the side of the cavity surface of the lower die half 90b through vacuuming, so that the cover member 82 intimately contacts the base member 81. Finally, the cover member 82 is bonded to the surface of the base member 81 by closing the die 90. Typically, an adhesive is used to bond the cover member 82 to the base member 81.

Generally, the ornamental surface of the interior part 80 has a number of curved shapes to give a quality appearance. It is difficult to integrate the flat cover member 82 with a member having such a three-dimensional configuration. Therefore, defective can be caused. For example, there may be cases where the cover member 82 is displaced from a proper position with respect to the base member 81, or the cover member 82 is partially creased. To deal with such problems, for example, Japanese Laid-Open Patent Publication No. 7-205167 proposes an in-die cover forming method in which a fixation apparatus is used. The fixation apparatus disclosed in the publication No. 7-205167 includes actuators each having an actuation rod at a periphery of an upper die half. When the die is opened, the actuation rods are caused to move toward a lower die half. The actuation rods are moved downward when the die is closed so that the rods press and fix a cover member placed on a lower die half at the periphery. The rods are retracted by the pressure applied by the lower die half as the die is closed.

On the other hand, Japanese Laid-Open Patent Publication No. 2001-179759 discloses a method for forming a product through bonding. In this method, a cover member on the back of which an adhesive layer is formed is pressed against a core having a curved shape. Thereafter, folded portions at the periphery of the cover member are folded back to contact the back of the core. This forming method is characterized by the following features. That is, when pressing the cover member against the surface of the core using the die, water is applied to the back of the folded portions so that the bonding function of the adhesive layer is temporarily lowered. Then, the folded portions are heated so that the portions recover adhesive function, and folded along the back of the core.

As described above, it is difficult to integrate the flat cover member 82 with the base member 81 so as to the cover member 82 conform to the surface of the base member 81 having a three-dimensional shape. Thus, the yield cannot be sufficiently increased simply by determining the position of the base member 81 with respect to the lower die half 90b in the longitudinal and transverse directions, or by suppressing the displacement of the cover member 82 relative to the lower die half 90b. Particularly, if the base member 81 has an elongated shape, the base member 81 is likely to be warped after injection molding. This creates variations in dimensional accuracy. When performing the in-die cover forming method using the base member 81, one end of the base member 81 is likely to separate from the lower die half 90b as schematically shown in FIG. 3. This can crease or break the cover member 82. There is therefore much demand for a technique that significantly increases the yield by suppressing defective due to variations in dimensional accuracy of the base member 81.

SUMMARY OF THE INVENTION

Accordingly, it is an objective of the present invention to provide an in-die cover forming method and a method for manufacturing a product integrated with a cover, which methods increase the yield by suppressing the occurrence of defective.

To achieve the foregoing objectives, and in accordance with one aspect of the present invention, an in-die cover forming method for integrally forming a cover member with a surface of a base member in a die is provided. The die includes a first die member and a second die member. At least one of the first and second die members is movable relative to the other in a die moving direction. The in-die cover forming method includes: setting the base member on the second die member such that a back of the base member is opposed to the second die member; determining, by a position determining mechanism located between the second die member and the back of the base member, a position of a surface of the base member in relation to the second die member in the die moving direction when setting the base member; placing the cover member between the base member set on the second die member and the first die member; and integrating the cover member with the surface of the base member by closing the first die member with respect to the second die member while pressing the cover member against the base member through vacuuming.

In accordance with another aspect of the present invention, a method for manufacturing a product integrated with a cover, in which a cover member is integrated with a surface of a base member, is provided. The method includes integrally forming the cover member with the surface of the base member in a die. The die includes a first die member and a second die member. At least one of the first and second die members is movable relative to the other. The integrally forming the cover member with the surface of the base member includes: setting the base member on the second die member such that a back of the base member is opposed to the second die member; determining a position of the surface of the base member in relation to the second die member in the die moving direction when setting the base member, by causing an engaging claw provided on a back of the base member to engage with a locking projection provided on the second mold member; placing the cover member between the base member set on the second die member and the first die member; and integrating the cover member with the surface of the base member by closing the first die member with respect to the second die member while pressing the cover member against the base member through vacuuming. The method further includes trimming an edge of the cover member along a peripheral portion of the base member in a state where the back of the base member is supported by a jig. The jig includes a locking claw engageable with the engaging claw. During the trimming, the position of the base is determined in relation to the jig by causing the engaging claw with the locking claw.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A method for manufacturing a product integrated with a cover according to one embodiment of the present invention will now be described.

Figure 1A:
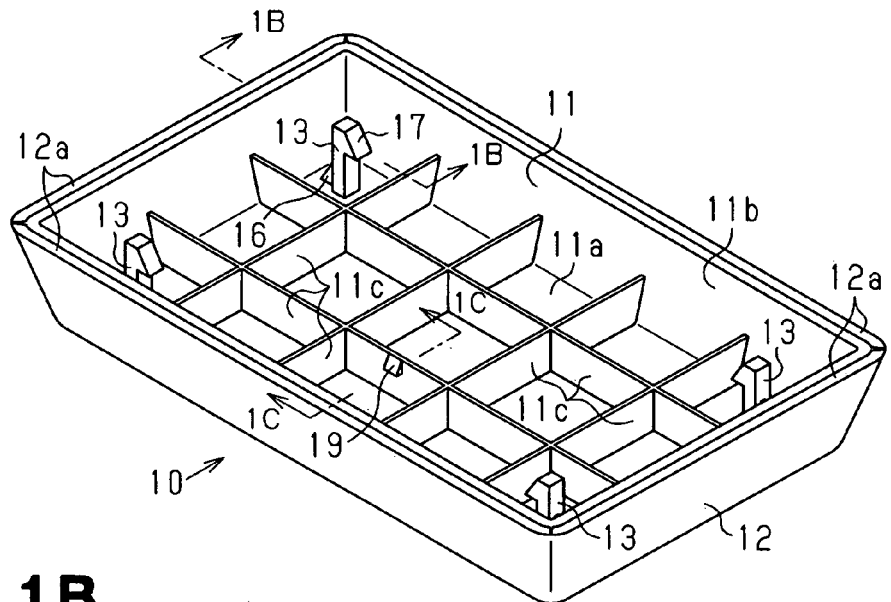
FIG. 1A is a perspective view illustrating the back of a product integrated with a cover.

FIG. 1A is a perspective view showing the back of a product 10 integrated with a cover, which product is manufactured by the method according to the present invention. The integrated product 10 includes a resin base member 11, which is formed by injection molding. The base member 11 includes a rectangular plate-like upper wall 11a, side walls 11b extending downward from the periphery of the upper wall 11a, and reinforcing ribs 11c extending downward from the back of the upper wall 11a to form a grid pattern. The side walls 11b flare toward the lower end.

The surface of the integrated product 10 (ornamental surface) is covered with a cover member 12 bonded to the upper face of the upper wall 11a and the surfaces of the side walls 11b. The cover member 12 has folded portions 12a along the lower ends of the side walls 11b. The folded portions 12a are folded inward and bonded to the integrated product 10. The cover member 12 is bonded to the base member 11 with adhesive.

Figure 1B:
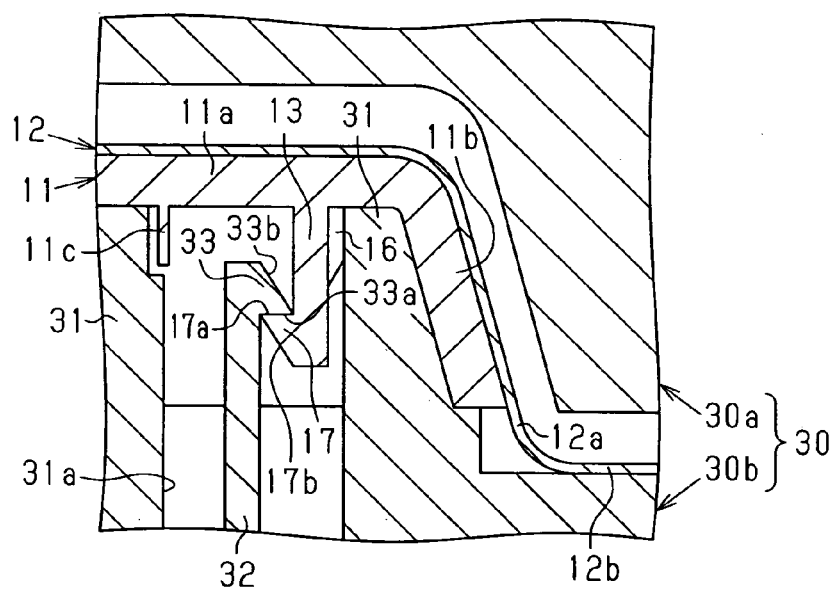
FIG. 1B is a cross-sectional view taken along line 1B to 1B of FIG. 1A, illustrating a part of a base member and a cover member placed on a mold.

As shown in FIGS. 1A and 1B, an engaging projection 13 is provided in each corner of the back of the upper wall 11a. A triangular reinforcing plate 16 is provided at the proximal end of each engaging projection 13 to connect the projection 13 with the back of the upper wall 11a. Each reinforcing plate 16 increases the strength of the corresponding engaging projection 13. Each reinforcing plate 16 is formed to extend toward an end of the base member 11 in the longitudinal direction.

A first upper engaging claw 17 is located at the distal end of each engaging projection 13. Each first upper engaging claw 17 is formed on a side opposite to the side of the reinforcing plate 16 in the corresponding engaging projection 13. As shown in FIG. 1B, each first upper engaging claw 17 is formed like a hook and includes an engaging surface 17a extending substantially parallel to the back of the upper wall 11a, and a tapered surface 17b that connects the distal end of the engaging surface 17a and the distal end of the engaging projection 13. The first tapered surface 17b is inclined such that it separates further from a side of the engaging projection 13 as it approaches the upper wall 11a.

Figure 1C:
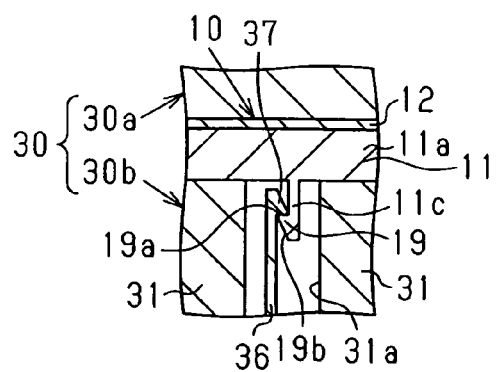
FIG. 1C is a cross-sectional view taken along line 1C to 1C of FIG. 1A, illustrating a part of a base member and a cover member placed on a mold.

As shown in FIGS. 1A and 1C, some of the reinforcing ribs 11c are provided with a second upper engaging claw 19. Each second upper engaging claw 19 is located at a center of the corresponding reinforcing rib 11c with respect to the longitudinal direction of the base member 11. As shown in FIG. 1C, each engaging claw 19 is formed like a hook and includes a second engaging surface 19a extending substantially parallel to the back of the upper wall 11a, and a tapered surface 19b that connects the distal end of the engaging surface 19a and the distal end of the corresponding reinforcing rib 11c. The second tapered surface 19b is inclined to separates further from a side of the corresponding reinforcing rib 11c as it approaches the upper wall 11a.

The method for manufacturing the integrated product 10 will now be described.

The method for manufacturing the integrated product 10 of the present embodiment includes a forming process for integrating the cover member 12 with the surface of the base member 11, and a trimming process for trimming edges of the molded cover member 12.

The forming process will first be described.

In the forming process, the in-die cover forming method using a die 30 shown in FIGS. 1B and 1C is applied. Specifically, the cover member 12 is shaped to conform to the shape of the base member 11 and is bonded to the base member 11. The die 30 includes an upper die half 30a and a lower die half 30b, which are vertically arranged to be closed and opened. When the die 30 is closed and opened, at least one of the upper die half 30a and the lower die half 30b is moved relative to the other. The vertical direction as viewed in FIG. 1B is die closing/opening direction, that is, the direction of relative movement of the upper die half 30a and the lower die half 30b. The upper die half 30a corresponds to a first die member, and the lower die half 30b corresponds to a second die member. The upper die half 30a and the lower die half 30b are each configured to enable vacuuming for causing the cover member 12 to intimately contact a parting line surface (PL surface). The upper die half 30a includes a cavity surface, which is formed to correspond to the surface of the integrated product 10 (ornamental surface).

A base 31 is provided in an upper portion of the lower die half 30b. The base 31 has a shape that corresponds to the back of the base member 11. The base 31 has sections that each contact the back of the upper wall 11a and the inner surface of the side wall 11b so that the position of the base member 11 is determined in the longitudinal direction and the transverse direction of the base member 11 (the longitudinal direction and the transverse direction of the upper wall 11a). The longitudinal and transverse directions are defined in a plane that is perpendicular to the direction in which the die halves 30a, 30b are moved relative to each other. Also, recesses 31a are formed on the upper surface of the base 31 to conform to the reinforcing ribs 11c and the engaging projections 13. In each of the recesses 31a that correspond to the engaging projection 13, a first locking projection 32 (see FIG. 1B) is provided. In each of the recesses 31a that correspond to the second upper engaging claws 19, a second locking projection 36 (see FIG. 1C) is provided.

As shown in FIG. 1B, each first locking projection 32 projects upward from the bottom of the corresponding recess 31a, and has a first lower engaging claw 33 to be engaged with the engaging projection 13. Each first lower engaging claw 33 is formed like a hook and includes a first contact surface 33a extending substantially along a horizontal plane to contact the engaging surface 17a of the engaging projection 13, and a first inclined surface 33b that connects the distal end of the contact surface 33a and the distal end of the first locking projection 32. Each first inclined surface 33b is inclined such that it separates further from the locking projection 32 as it approaches the lower end.

As shown in FIG. 1C, each second locking projection 36 projects upward from the bottom of the corresponding recess 31a, and has a second lower engaging claw 37 to be engaged with the second upper engaging claw 19 of the base member 11. As in the case of the first lower engaging claws 33, each second lower engaging claw 37 is formed like a hook and includes a second contact surface extending substantially along a horizontal plane to contact the second engaging surface 19a, and a second inclined surface that connects the distal end of the contact surface and the distal end of the second locking projection 36. Each second inclined surface is inclined to separate further from the locking projection 36 as it approaches the lower end.

In this embodiment, the first upper engaging claws 17 provided on the engaging projections 13 of the base member 11, and the first lower engaging claws 33 provided in the first locking projections 32 of the lower die half 30b form a first position determining mechanism. Also, the second upper engaging claws 19 provided on the base member 11, and the second lower engaging claws 37 provided in the second locking projections 36 of the lower die half 30b form a second position determining mechanism.

When performing the in-die cover forming method using the die 30, the base member 11 is placed on the lower die half 30b. At this time, as shown in FIG. 1B, the back of the upper wall 11a and the inner surface of the side walls 11b each contact the base 31. This determines the position of the base member 11 with respect to the lower die half 30b in the longitudinal and transverse directions. Further, as shown in FIGS. 1B and 1C, the reinforcing ribs 11c, the engaging projections 13, and the second upper engaging claws 19 each enter the corresponding recess 31a.

When entering the corresponding recess 31a, each engaging projection 13 is elastically deformed while the first tapered surface 17b slides along the inclined surface 33b of the locking projection 32. Thereafter, when the engaging surface 17a of the engaging projection 13 contacts the contact surface 33a of the first locking projection 32, the elastic deformation of the engaging projection 13 disappears and the engaging projection 13 returns to the original shape. As a result, the engaging projection 13 is engaged with the first locking projection 32 of the lower die half 30b.

On the other hand, when each second upper engaging claw 19 enters the corresponding recess 31a, the corresponding portion of the reinforcing rib 11c connecting the second upper engaging claw 19 to the upper wall 11a is deformed, while the second tapered surface 19b slides along the inclined surface of the corresponding second locking projection 36. Thereafter, when the engaging surface 19a of the second upper engaging claw 19 contacts the contact surface of the second locking projection 36, the elastic deformation of the reinforcing rib 11c disappears and the reinforcing rib 11c returns to the original shape. As a result, the second upper engaging claw 19 is engaged with the second locking projection 36 of the lower die half 30b.

When the engaging projections 13 and the second upper engaging claws 19 provided in the corners and the center portions of the upper wall 11a are engaged with the locking projections 32, 36 of the lower die half 30b as described above, the upper surface of the upper wall 11a is located at an appropriate height with respect to the lower die half 30b at any position in a plane containing the longitudinal and transverse directions. Accordingly, the vertical position of the surface of the base member 11 is determined in relation to the lower die half 30b at any position in a plane containing the longitudinal and transverse directions. Since the engaging projections 13 are arranged in two rows both along the longitudinal and transverse directions, the relative positions among the engaging projections 13 permits the position of the base member 11 to be determined both in the longitudinal and transverse directions relative to the lower die half 30b. Therefore, according to the in-die cover forming method of the present embodiment, the position of the surface of the base member 11 is determined relative to the lower die half 30b all in the longitudinal, transverse, and vertical directions. The vertical direction corresponds to the die closing/opening direction, that is, the direction of relative movement of the upper die half 30a and the lower die half 30b.

Then, the cover member 12 having a size larger than the base member 11 is heated and softened with its opposite sides clamped. The softened cover member 12 is placed between the base member 11 on the lower die half 30b and the upper die half 30a. Thereafter, the cover member 12 is vacuumed from the PL surface of the upper die half 30a so that the surface of the cover member 12 (ornamental surface) intimately contacts the cavity surface of the upper die half 30a. At this time, if the cavity surface of the upper die half 30a has satin-like texture or grain, such patterns are transferred onto the surface of the cover member 12.

Thereafter, the PL surfaces of the upper die half 30a and the lower die half 30b are brought into contact while the edge of the cover member 12 is held between the upper die half 30a and the lower die half 30b. Subsequently, the cover member 12 is vacuumed from the PL surface of the lower die half 30b so that the cover member 12 intimately contacts the surface of the base member 11 and the lower die half 30b. Thereafter, the upper die half 30a and the lower die half 30b are closed. As a result, the integrated product 10, in which the surface of the base member 11 is bonded to the back of the cover member 12, is formed in the die 30.

Figure 2:
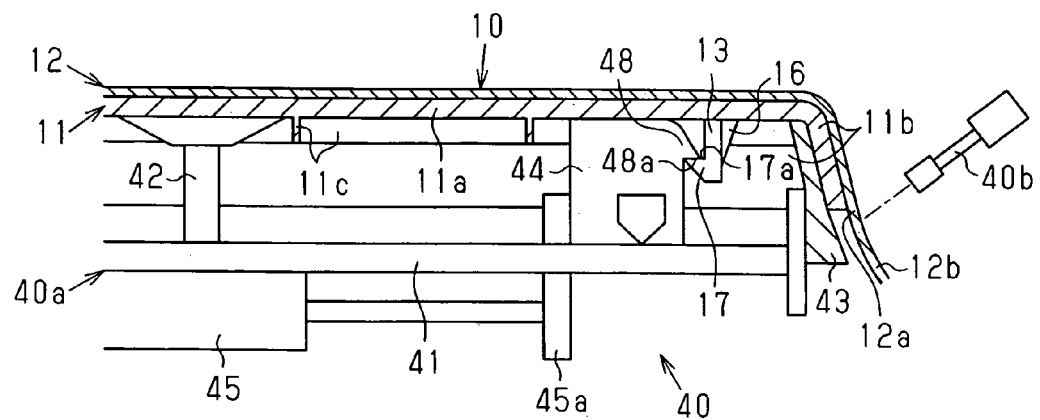
FIG. 2 is a cross-sectional view schematically showing a trimming process.
Figure 3:
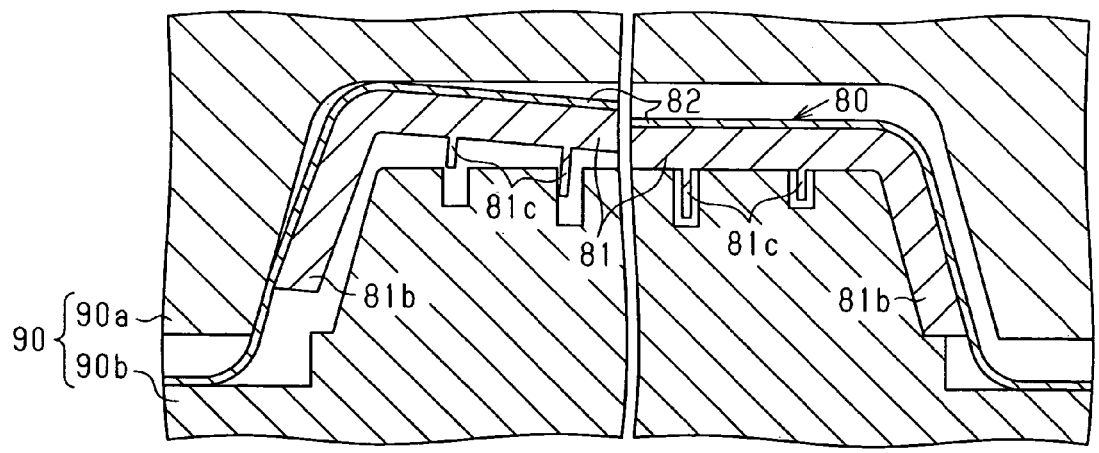
FIG. 3 is a cross-sectional view schematically showing a process of a prior art in-die cover forming method.

When the integrated product 10 is demolded from the die 30, the cover member 12 is integrated with the surface of the base member 11 as shown in FIG. 2. In the integrated product 10, peripheral portions of the cover member 12 stick out of the edge of the base member 11 (the lower ends of the side walls 11b). The peripheral portions of the cover member 12 include the folded portions 12a and excess portions 12b located outside of the folded portions 12a. The excess portions 12b include parts that are clamped during heating of the cover member 12, and parts held between the edges of the upper and lower die halves 30a, 30b. The excess portions 12b are removed in the trimming process, which will be described below.

The trimming process will hereafter be described.

In the trimming process, a jig 40 shown in FIG. 2 is used. The jig 40 includes a support portion 40a for supporting the integrated product 10, and a water jet cutter 40b for removing the excess portion 12b. The water jet cutter 40b is located at a side of the support portion 40a. The water jet cutter 40b is moved along the edge of the integrated product 10 supported by the support portion 40a, and blows high pressure water flow to the proximal ends of the excess portions 12b, thereby removing the excess portions 12b.

The support portion 40a has a support base 41 provided parallel to the back of the base member 11. A suction portion 42 is provided in a center of the upper surface of the support base 41 to vacuum the base member 11 so that the base member 11 intimately contacts a predetermined part. A contact portion 43 is provided in the periphery of the support base 41. The contact portion 43 contacts the inner surface of the side wall 11b of the base member 11. The contact portion 43 is formed as a rectangular frame extending along each side of the upper wall 11a.

Position determining members 44 are provided on the upper surface of the support base 41. Each position determining member 44 corresponds to one of the engaging projections 13. The position of each position determining member 44 is determined in the longitudinal direction or the transverse direction on the support base 41 by means of a pressing portion 45a of an air cylinder 45 fixed to the support base 41. Each position determining member 44 has a locking claw 48 in an upper portion. The locking claw 48 is engaged with the corresponding engaging projection 13 of the base member 11. Each locking claw 48 includes a third contact surface 48a that is substantially horizontal. That the third contact surface 48a contacts the engaging surface 17a of the first upper engaging claw 17 of the corresponding engaging projection 13. The third contact surfaces 48a of the locking claws 48 of the position determining members 44 and the engaging surfaces 17a of the first upper engaging claws 17 provided on the engaging projections 13 of the base member 11 form a third position determining mechanism.

When performing the trimming process using the jig 40, the integrated product 10 is placed on the support base 41. At this time, as shown in FIG. 2, the back of the upper wall 11a of the base member 11 is sucked by the suction portion 42, and the side walls 11b of the base member 11 contact the contact portion 43. Thus, the position of the base member 11 of the integrated product 10 is determined relative to the support portion 40a of the jig 40 with respect to the longitudinal and transverse directions.

Next, the pressing portions 45a of the air cylinders 45 are extended along the support base 41 so that the locking claw 48 of each position determining member 44 is engaged with the corresponding engagement projection 13 of the base member 11. At this time, the engaging surface 17a of each engaging projection 13 is brought into contact with the contact surface 48a of the locking claw 48. When the engaging projections 13 provided in the corners of the upper wall 11a are engaged with the locking claws 48 of the support portion 40a, the upper surface of the upper wall 11a is located at an appropriate height with respect to the support portion 40a at any position in a plane containing the longitudinal and transverse directions. The vertical direction is defined as a direction perpendicular to the upper wall 11a (the upper surface and the back of the upper wall 11a). Therefore, the vertical position of the surface of the integrated product 10 is determined in relation to the support portion 40a at any position in a plane containing the longitudinal and transverse directions. As a result, the position of the boundary between the folded portions 12a and the excess portions 12b of the cover member 12 is determined in the vertical direction with respect to the contact portions 43 along the entire periphery of the cover member 12.

Since the engaging projections 13 are arranged in two rows both along the longitudinal and transverse directions, the relative positions among the engaging projections 13 permits the position of the surface of the integrated product 10 to be determined both in the longitudinal and transverse directions relative to the support portion 40a. Therefore, during the trimming process of the present embodiment, the position of the boundary between the folded portions 12a and the excess portions 12b is determined with respect to the contact portion 43 along the entire periphery of the cover member 12 all in the longitudinal, transverse, and vertical directions.

Then, the excess portions 12b of the integrated product 10 placed on the support portion 40a is removed by means of the water jet cutter 40b as indicated by an alternate long and short dash line in FIG. 2. At this time, since the position of the integrated product 10 is determined with respect to the support portion 40a all in the longitudinal, transverse, and vertical directions, the excess portion 12b of the cover member 12 is removed by means of the water jet cutter 40b while the folded portions 12a having a constant width are remained in the periphery of the base member 11. Finally, the integrated product 10 is removed from the support portion 40a. Then, the folded portion 12a of the cover member 12 is bonded to the lower surface of the side wall 11b of the base member 11, so that the integrated product 10 shown in FIG. 1A is completed.

The above embodiment has the advantages described below.

According to the in-die cover forming method according to the present embodiment, when placing the base member 11 in the die 30, the first and second position determining mechanisms determine the position of the surface of the base member 11 at a predetermined height in relation to the lower die half 30b at any position in a plane containing the longitudinal and transverse directions. Therefore, the surface of the base member 11 is located at the predetermined height in relation to the upper die half 30a at the predetermined position in the longitudinal and transverse directions. As a result, the cover member 12 is arranged at an appropriate position between the surface of the base member 11 and the upper die half 30a, and is integrated with the surface of the base member 11. Therefore, after bonding, the cover member 12 is less likely to be creased or broken. Accordingly, defective of the integrated product 10 is suppressed. This, in turn, increases the yield.

Particularly, when the base member 11 is formed through injection molding, which is likely to cause variations in the dimensional accuracy in the vertical direction such as warping. Such variations are reliably corrected by the position determining mechanisms. Further, in a case where the thickness of the base member 11 (the upper wall 11a) is decreased or the number of the reinforcing ribs 11c is decreased to reduce the weight, variations in the dimensional accuracy is likely to occur due to warping of the base member 11. The position determining mechanisms of the present embodiment are particularly suitable for such cases.

Further, in the integrated product 10 of the present embodiment, the distance between the surface of the base member 11 and the engaging surfaces 17a, 19a of the upper engaging claws 17, 19 located below the base member 11 is significantly smaller than the longitudinal and transverse dimensions of the base member 11, the dimensional accuracy of which is likely to be degraded. In the injection molded base member 11, warping mostly occurs in the upper wall 11a, which is formed like a flat plate, and hardly occurs in the engaging projections 13 of the reinforcing ribs 11c. The upper engaging claws 17, 19 therefore have a high dimensional accuracy in relation to the surface of the base member 11. Thus, by determining the height of the surface of the base member 11 in relation to the lower die half 30b by means of the position determining mechanisms including the upper engaging claws 17, 19 of the base member 11 and the lower engaging claws 33, 37 of the lower die half 30b, the occurrence of the defective is suppressed and the yield is increased.

According to the in-die cover forming method of the present embodiment, the position determining mechanisms determine the position of the surface of the base member 11 in relation to the lower die half 30b in the vertical direction by causing the upper engaging claws 17, 19 to be engaged with the locking projections 32, 36. The upper engaging claws 17, 19 are spaced from the surface of the base member 11 in the vertical direction. Thus, when the upper engaging claws 17, 19 are engaged with the locking projection 32, 36, the position of the surface of the base member 11 is easily determined in relation to the locking projections 32, 36 in the vertical direction.

According to the method for manufacturing the integrated product 10, the in-die cover forming method prevents the produced cover member 12 from being creased or broken during the forming process. In the trimming process, the first upper engaging claws 17 of the base member 11 are engaged with the locking claws 48 of the jig 40, so that the cover member 12 integrated with the base member 11 is trimmed while the position of the cover member 12 is determined at a predetermined height in relation to the support portion 40a of the jig 40 at any position in a plane containing the longitudinal and transverse directions. Therefore, the method facilitates the production of the high quality integrated product 10, in which the cover member 12 is not creased or broken, and has a peripheral portion of the predetermined width along the periphery of the base member 11. As a result, the occurrence of defective is suppressed, and the yield is increased.

The preferred embodiment may be modified as described below.

The first upper engaging claws 17 may project from a side of each engaging projection 13 in any direction among directions perpendicular to the vertical direction. Likewise, the second upper engaging claws 19 may project from a side of the reinforcing ribs 11c in any direction among directions perpendicular to the vertical direction.

One to three of the four engaging projections 13 of the base member 11 may be omitted. The engaging projections 13 may be located in any positions on the back of the upper wall 11a. The engaging projections 13 are preferably located at both ends in the longitudinal direction so that the position of the surface of the base member 11 is determined in the vertical direction in relation to the lower die half 30b at any position in a plane containing the longitudinal and transverse directions, and that the position of the surface of the base member 11 is determined in the longitudinal direction in relation to the lower die half 30b.

Each of the first and second position determining mechanisms may include any type of engagement as long as the mechanisms allow the position of the surface of the base member 11 to be determined in the vertical direction in relation to the lower die half 30b. Likewise, each third position determining mechanism may include any type of engagement as long as the mechanisms allow the position of the surface of the base member 11 to be determined in the vertical direction in relation to the support portion 40a of the jig 40.

The first position determining mechanism or the second position determining mechanism may be omitted. If the first position determining mechanism is omitted, at least a pair of second upper engaging claws 19 are preferably located at each end in the longitudinal direction of the base member 11 so that the vertical position of the surface of the base member 11 is determined in relation to the lower die half 30b at any position in a plane containing the longitudinal and transverse directions.

In addition to the third contact surface 48a of the position determining member 44 of the jig 40, the support portion 40a of the jig 40 may be provided with another contact surface that is engaged with the engaging surface 19a of the second upper engaging claw 19 of the base member 11. The third contact surface 48a may be omitted, and only a contact surface that is engaged with the engaging surface 19a may be provided on the support portion 40a of the jig 40.

In the illustrated embodiment, the die 30 includes the vertically arranged upper and lower die halves 30a, 30b. However, a mold that is opened and closed laterally may be used.

A configuration in which the die 30 is inverted may be adopted. Specifically, the upper die half 30a of the illustrated embodiment may be located below the lower die half 30b, and the die halves 30a, 30b may be vertically closed and opened. In this case, the vertical direction, the longitudinal direction, and the lateral direction in the illustrated embodiment should be appropriately interpreted in accordance with the relative positions of the upper and lower die halves 30a, 30b, and the direction of closing.

In the illustrated embodiment, the support base 41 of the jig 40 is oriented horizontally. However, the support base 41 may be oriented vertically.

The jig 40 of the illustrated embodiment may be inverted. Specifically, the integrated product 10 may be located below the support base 41 of the illustrated embodiment. In this case, the vertical direction, the longitudinal direction, and the lateral direction in the illustrated embodiment should be appropriately interpreted in accordance with the relative positions of the jig 40 and the base member 11.

The invention claimed is:

1. A method for manufacturing an automobile interior part integrated with a cover, in which a cover member is integrated with a surface of a base member of the automobile interior part, the method comprising:

integrally forming the cover member with the surface of the base member of the automobile interior part in a die, the die including a first die member and a second die member, wherein at least one of the first and second die members is movable relative to the other, wherein said integrally forming the cover member with the surface of the base member includes:

setting the base member on the second die member such that a back of the base member is opposed to the second die member;

determining a position of the surface of the base member in relation to the second die member in the die moving direction when setting the base member, by causing an engaging claw provided on a back of the base member to engage with a locking projection provided on the second mold member;

placing the cover member between the base member set on the second die member and the first die member; and integrating the cover member with the surface of the base member by closing the first die member with respect to the second die member while pressing the cover member against the base member through vacuuming; and trimming an edge of the cover member along a peripheral portion of the base member in a state where the back of the base member is supported by a jig, wherein the jig includes a locking claw engageable with the engaging claw, wherein, during the trimming, the position of the base is determined in relation to the jig by causing the engaging claw to engage with the locking claw.

2. The method according to claim 1, wherein the engaging claw is engaged with the locking projection such that the base member is prevented from separating from the second die member in the die moving direction.

3. The method according to claim 1, wherein said causing the engaging claw to engage with the locking projection includes causing an engaging surface of the engaging claw, which surface intersects the die moving direction, to engage with a contact surface provided on the locking projection.

4. The method according to claim 3, wherein the engaging claw is shaped like a hook, and the engaging claw includes a tapered surface that connects a distal end of the engaging surface to a distal end of the locking projection.

* * * * *